(12) United States Patent
Hardin

(10) Patent No.: US 12,078,243 B2
(45) Date of Patent: Sep. 3, 2024

(54) METHODS AND SYSTEMS FOR IMPROVING THE OPERATION OF TRANSMISSIONS FOR MOTOR VEHICLES

(71) Applicant: David A. Hardin, El Monte, CA (US)

(72) Inventor: David A. Hardin, El Monte, CA (US)

(73) Assignee: Transgo, LLC, El Monte, CA (US)

( * ) Notice: Subject to any disclaimer, the term of this patent is extended or adjusted under 35 U.S.C. 154(b) by 124 days.

(21) Appl. No.: 17/868,998

(22) Filed: Jul. 20, 2022

(65) Prior Publication Data

US 2024/0026969 A1 Jan. 25, 2024

(51) Int. Cl.
*F16H 61/00* (2006.01)

(52) U.S. Cl.
CPC . *F16H 61/0021* (2013.01); *F16H 2061/0034* (2013.01); *F16H 2061/0062* (2013.01)

(58) Field of Classification Search
CPC ......... F16H 61/0021; F16H 2061/0034; F16H 2061/0062
USPC ...................................... 192/85.63
See application file for complete search history.

(56) References Cited

U.S. PATENT DOCUMENTS

| | | | |
|---|---|---|---|
| 4,449,426 A | 5/1984 | Younger | |
| 4,711,140 A | 12/1987 | Younger | |
| 4,790,938 A | 12/1988 | Younger | |
| 5,086,884 A * | 2/1992 | Gordon | F16D 65/567 188/71.9 |
| 5,119,914 A * | 6/1992 | Dadel | F16D 48/02 192/109 F |
| 5,253,549 A | 10/1993 | Younger | |
| 5,540,628 A | 7/1996 | Younger | |
| 5,624,342 A | 4/1997 | Younger | |
| 5,730,685 A | 3/1998 | Younger | |
| 5,743,823 A | 4/1998 | Younger | |
| 5,768,953 A | 6/1998 | Younger | |
| 5,820,507 A | 10/1998 | Younger | |
| 5,967,928 A | 10/1999 | Younger | |

(Continued)

*Primary Examiner* — Colby M Hansen
(74) *Attorney, Agent, or Firm* — Mark P. Stone

(57) ABSTRACT

The hydraulic circuitry of a factory installed automatic automotive transmission is modified to replace an underdrive accumulator spring with a shorter spring and a separate lower rated spring washer operatively associated with the shorter replacement underdrive accumulator spring. The combined replacement spring and spring washer conjointly act on an underdrive accumulator piston to move it in two predetermined distances, in two separate continuous stages, namely, movement of the piston for a first predetermined distance is controlled by the spring washer, while movement of the piston for a second predetermined distance is controlled by the replacement spring. The spring washer has a lower spring rating than the replacement spring, so that less fluid pressure is required to move the piston the total distance traveled, resulting in less fluid pressure applied to an underdrive clutch than in the factory installed transmission. The spring ratings of the replacement spring and the spring washer are selected such that the total fluid pressure required to move the piston both the first and second predetermined distances is less than the fluid pressure required to overcome the resilient force of underdrive piston return springs acting on an underdrive apply piston so that a lower fluid pressure is applied to an underdrive clutch.

18 Claims, 3 Drawing Sheets

(56) References Cited

U.S. PATENT DOCUMENTS

| | | | |
|---|---|---|---|
| 6,099,429 | A | 8/2000 | Younger |
| 6,117,047 | A | 9/2000 | Younger |
| 6,287,231 | B1 | 9/2001 | Younger |
| 6,390,944 | B1 | 5/2002 | Younger |
| 6,565,472 | B1 | 5/2003 | Younger |
| 6,699,157 | B2 | 3/2004 | Younger |
| 6,729,989 | B2 | 5/2004 | Younger |
| 6,814,680 | B2 | 11/2004 | Younger |
| 6,871,397 | B2 | 3/2005 | Younger |
| 6,913,554 | B2 | 7/2005 | Younger |
| 6,964,628 | B2 | 11/2005 | Younger |
| 7,128,679 | B2 | 10/2006 | Younger |
| 7,331,893 | B2 | 2/2008 | Younger |
| 9,429,228 | B2 | 8/2016 | Younger |
| 9,970,534 | B2 | 5/2018 | Younger |
| 10,724,628 | B2 | 7/2020 | Hardin |
| 10,948,059 | B2 | 3/2021 | Hardin |
| 11,105,415 | B2 | 8/2021 | Hardin |
| 2005/0194230 | A1* | 9/2005 | Tsukada .................. F16D 13/56 192/89.26 |

* cited by examiner

METHODS AND SYSTEMS FOR IMPROVING THE OPERATION OF TRANSMISSIONS FOR MOTOR VEHICLES

BACKGROUND OF THE INVENTION

The methods and systems of the present invention are directed to the modification and improvement of automatic transmissions for automotive vehicles, more commonly referred to as "factory installed" transmissions, installed in automotive vehicles by an original motor vehicle manufacturer. The invention is more particularly directed to improvements to the "factory installed" hydraulic circuitry of automatic automotive transmissions designated as the DODGE RAM 68RFE installed in vehicles manufactured by Chrysler Corporation of Auburn, Mich. for the years 2019 and after.

Operation of the aforementioned DODGE RAM 68RFE automatic automotive transmission installed in vehicles manufactured by Chrysler Corporation of Auburn, Mich. for the years 2019 and after, is well known to, and within the knowledge of, persons skilled in the relevant art of automatic automotive transmission operation and design. Descriptions and illustrations of this "factory installed" automatic automotive transmission are published online at the "MOPAR Technical Service Portal" (TSP) website, https://www.mopartsp.com, "Automatic-68RFE Schematics and Diagrams", the entire subject matter of which is hereby expressly incorporated by reference herein.

Raising line pressure by internal mechanical means (e.g., spring tension) or external transmission computer software manipulation in a 2019 and later 68RFE transmission (Dodge Ram Trucks) creates an unusual side effect, explained as follows.

The underdrive clutch is applied on by onboard computer control of the transmission underdrive solenoid in 1st, 2nd, 3rd,& 4th gears. The underdrive clutch is turned off while the transmission is in 5th and 6th gears as a result of a change in computer software for the factory installed transmissions for the years 2019 and later. While in 6th gear, any time main line pressure is, or is expected to be, below 139 pounds per square inch (psi), the transmission computer cycles the underdrive clutch on about every 1.7 seconds for 0.1 second by a pulse from the underdrive solenoid to keep air purged out of the underdrive clutch as it prepares to reapply this clutch in the event of changing driving conditions. Any time driving conditions require line pressure to be above 139 psi, such as hard throttle acceleration or climbing a hill, the underdrive 1.7 second cycle stops. As long as main line pressure is no greater than 139 psi, the pressure in the underdrive circuit increases to only 10 to 12 psi during this cycling. Since it takes a pressure of 18 or 19 psi to actually overcome the underdrive piston return springs and apply the clutch, this will not occur with line pressure not exceeding 139 psi. If main line pressure rises above 139 psi by any means, internal or external, the underdrive clutch apply pressure increases during the 0.1 second pulse for every 1.7 seconds cycling. Increasing the underdrive clutch apply pressure to 20 psi or greater is sufficient to overcome the resilient force of the underdrive piston return spring, resulting in the quick apply of the underdrive clutch causing the possible destruction of the underdrive clutch plates causing the failure of the underdrive clutch in a short period of time.

It is the primary object of the present invention to modify the hydraulic circuitry of the factory installed transmission to prevent the clutch apply pressure from exceeding a value which will overcome the resilient force of the underdrive piston return spring when the underdrive clutch is turned off in 5th and 6th gears.

SUMMARY OF THE INVENTION

In accordance with the present invention, the hydraulic circuitry of a factory installed automotive automatic transmission, in particular the DODGE RAM 68RFE Transmission, is modified to replace a factory installed high rate underdrive accumulator spring with a new and shorter high rate accumulator spring and a weaker, flat low rate waved spring washer operatively associated with the stronger, shorter higher rate underdrive accumulator spring for conjointly driving the underdrive accumulator piston.

The combined new shorter spring and spring washer combination results in reduced fluid pressure applied to the underdrive accumulator piston during the distance traveled by the accumulator piston while the low rate spring washer is acting on the accumulator piston before the shorter high rate spring acts on the accumulator piston, to conjointly move the accumulator piston two separate predetermined distances, in two separate continuous stages, to reduce the overall fluid pressure applied to the accumulator piston, so as to maintain the fluid pressure applied to underdrive clutch below that necessary to overcome the resilient force of the underdrive piston return springs.

As a result of the structural arrangement and operative relationship between the shorter underdrive accumulator replacement spring and the waved spring washer, the underdrive apply piston does not apply a pressure to the underdrive clutch high enough to potentially damage the underdrive clutch during operation of the transmission in 5th and 6th gears when underdrive clutch is turned off.

BEST MODES FOR CARRYING OUT THE INVENTION

Figure 1:
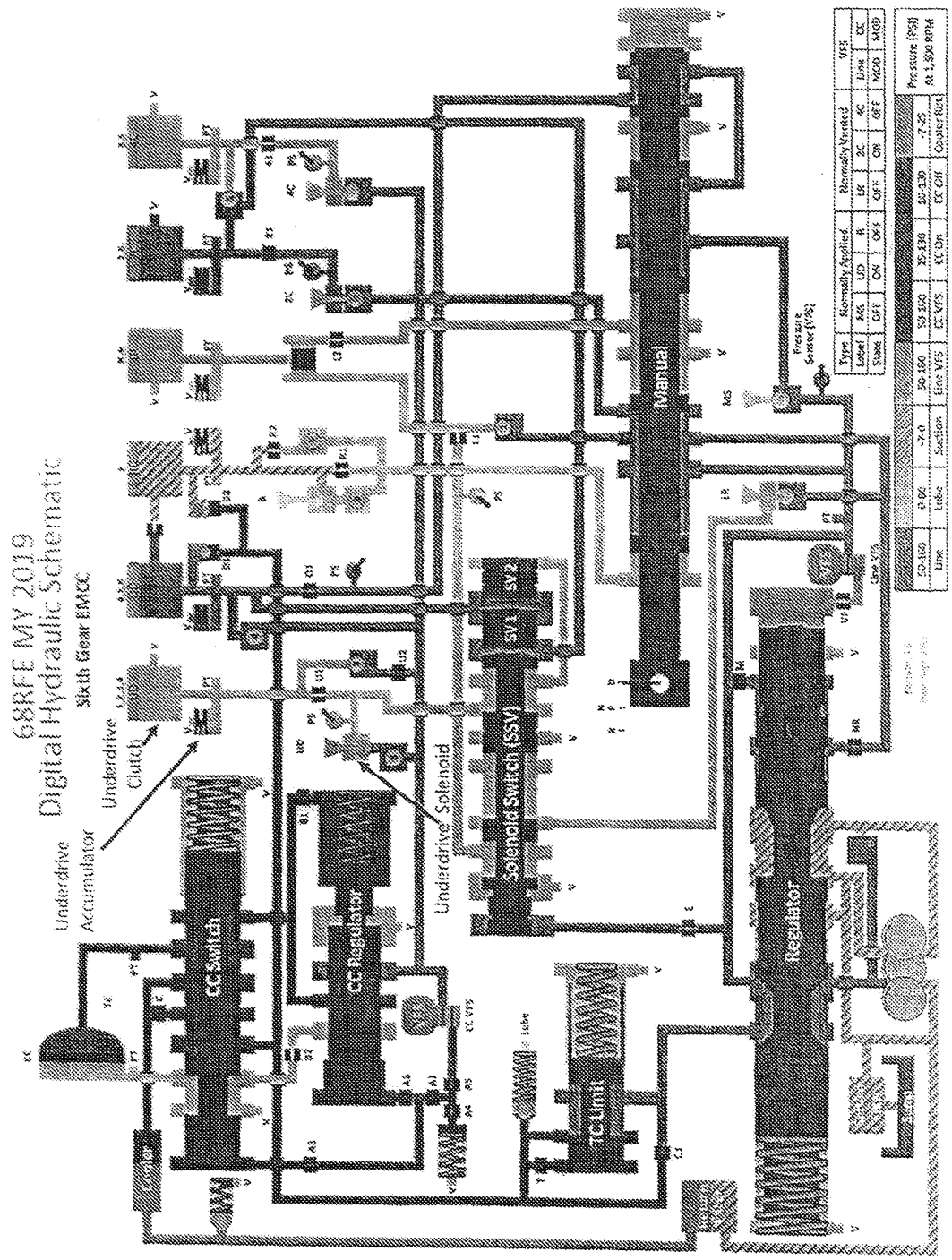
FIG. 1 illustrates the hydraulic circuit of a "factory installed" DODGE RAM 68RFE installed in vehicles manufactured by Chrysler Corporation of Auburn, Mich. for the years 2019 and after.

FIG. 1 of the drawing illustrates the "factory installed" hydraulic circuit for the DODGE RAM 68RFE automatic automotive transmission installed in vehicles manufactured by Chrysler Corporation of Auburn, Mich. for the years 2019 and after.

The components of the underdrive circuit of the "factory installed" 68RFE transmission are designated on the drawing.

Figure 2:
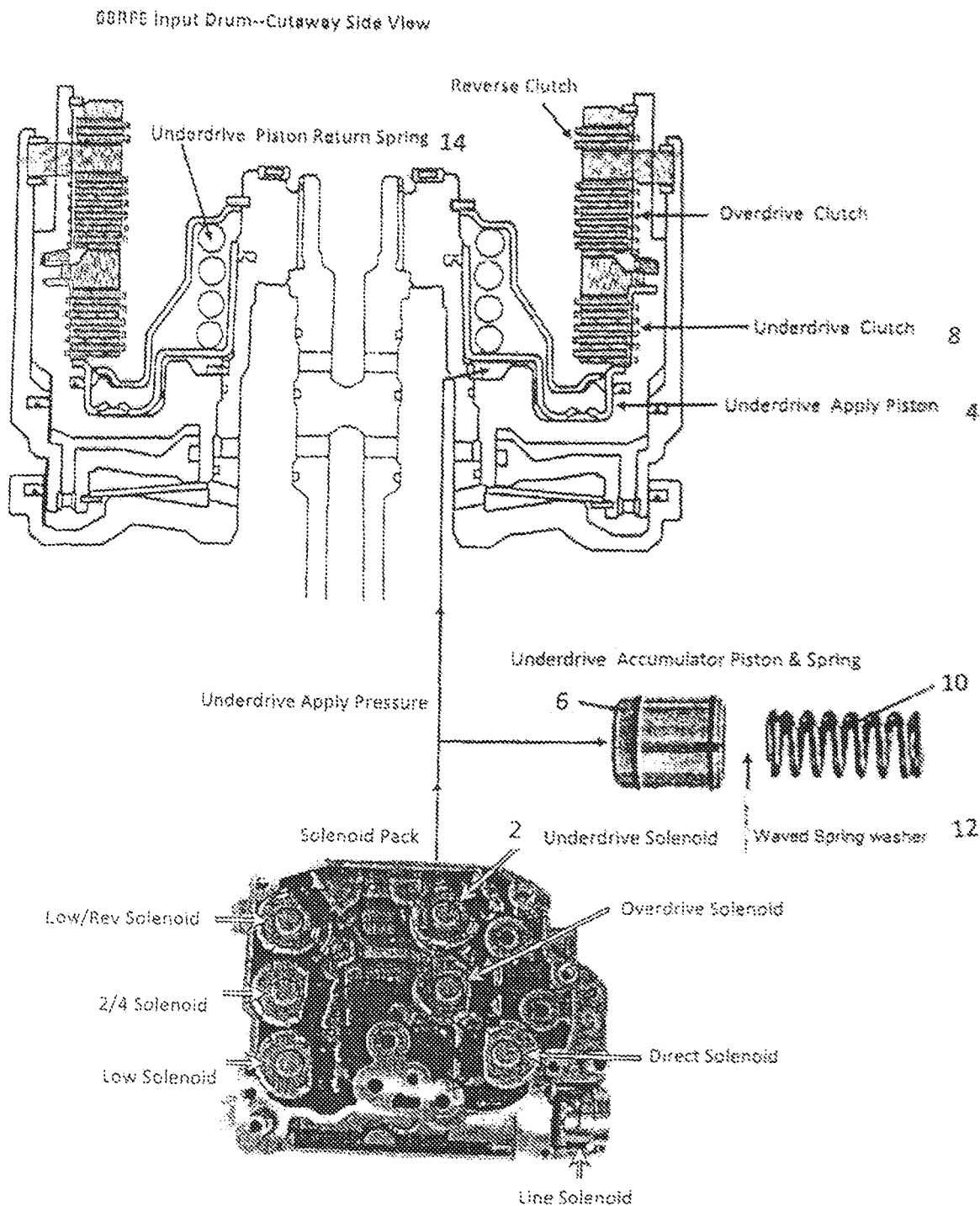
FIG. 2 is an isolated view of a portion of the hydraulic circuitry shown by FIG. 1 illustrating the modifications to the underdrive hydraulic circuit in accordance with the present invention.

FIG. 2 of the drawing illustrates an isolated section of the underdrive circuit of the 68TFE transmission showing the modifications to the underdrive circuit in accordance with the present invention.

The underdrive clutch pressure is applied and released by onboard computer electrical control of an underdrive solenoid (2). The factory range of 0-160 psi (pounds per square inch), underdrive apply pressure is transmitted from the underdrive solenoid to an underdrive apply piston (4), and feeds off to an underdrive accumulator piston (6) to help dampen or slow down the applying of fluid pressure to an underdrive clutch (8) for a smooth apply. How quickly the apply pressure to the underdrive clutch (8) rises is determined by two factors, namely, how quickly or slowly the onboard computer steps up the electrical signals transmitted to the underdrive solenoid (2), and, the rate (strength) of an underdrive accumulator spring (10) acting on the underdrive accumulator piston (6). The stronger the underdrive accumulator spring rate is, the greater oil pressure it takes to compress the spring (10) and the faster the underdrive apply piston (4) moves. The opposite is also true. The weaker the underdrive accumulator spring rate is, the less oil pressure is needed to move the underdrive accumulator piston (6) and the slower the underdrive apply piston (4) moves. The strength of the underdrive accumulator spring (10) that is opposing the movement of the underdrive accumulator piston (6) determines how high the pressure applied to the underdrive accumulator piston will rise during a pulse from the underdrive solenoid (2), as for example, during the 0.1 second pulse from the underdrive solenoid during the 1.7 second cycle of the underdrive clutch (8) by the onboard computer.

It has been determined that the underdrive accumulator piston moves a distance of 0.1 inch during the underdrive cycling every 1.7 seconds, when line pressure is between 175 to 200 psi. The factory installed underdrive accumulator spring has a spring rate of 320, meaning that it takes 320 pounds of force to compress it 1.0 inch, or 32 pounds of force to compress it 0.1 inch (i.e., a spring rate of 3.2). The underdrive accumulator piston diameter is 1.4" giving it an area of 1.539, such that the ratio Force/Area=pressure 32/1.539=20.8 PSI of underdrive apply pressure to move the accumulator piston 0.1 inch.

In accordance with the present invention, the factory installed underdrive accumulator piston spring is replaced by a shorter underdrive accumulator piston spring (10), preferably 0.130 inches shorter, having the same high rate spring characteristic as the factory installed spring, and a low rate waved spring washer (12), preferably formed from 0.010 thick spring steel, having a spring characteristic less (weaker) than that of the shorter replacement underdrive accumulator piston spring. In this manner, the waved spring washer (12) is compressed 0.120 inches from fully relaxed to fully compressed positions, requiring only 15 psi applied to fully compress the spring washer (i.e., a spring rate of 1.8). This allows the first 0.1 inches of travel of the underdrive accumulator piston to accumulate the short cycling of the underdrive solenoid at the lower (weaker) rate waved spring washer, while the remaining distance travelled by the underdrive accumulator piston is controlled by the shorter (stronger) higher rate underdrive accumulator piston spring (10).

The structural arrangement by which the shorter (stronger) higher spring characteristic underdrive accumulator spring (10) cooperates with the lower (weaker) spring characteristic waved spring washer (12) to conjointly drive the underdrive accumulator piston, results in the underdrive accumulator piston moving in two separate but continuous stages, namely, the initial movement of the accumulator piston for a first predetermined distance is controlled by the lower rate waved spring washer until it is fully compressed, while the final (second stage) continuous movement of the accumulator piston for a second predetermined distance is controlled by the shorter higher rated spring characteristic underdrive accumulator piston spring. Preferably, the first predetermined distance controlled by the weaker spring washer is shorter than the second predetermined distance which is controlled by the stronger underdrive accumulator spring since the spring washer is more quickly compressed than the underdrive accumulator piston spring. In any event, the first and second predetermined distances, as well as the fluid pressure needed to move the underdrive accumulator piston its total distance (i.e., the first and second predetermined distances), can be adjusted by adjusting the length and/or strength of the spring washer and the length and/or strength of the underdrive accumulator piston spring, respectively.

The result of the structural arrangement discussed above is that only 9.7 psi (15/1.539=9.7 psi) is applied to the underdrive clutch while the transmission is in 5th and 6th gear and the underdrive clutch is turned off. A fluid pressure of 9.7 psi is insufficient to overcome the resilient force of the underdrive piston return spring (14), so that the fluid pressure in the underdrive circuit is insufficient (e.g., below 20 psi) to start the underdrive clutch apply which will cause the underdrive clutch plates to burn and fail when main line pressure exceeds 139 psi.

By replacing the factory installed underdrive accumulator piston spring with a shorter spring (10) with the same spring characteristic (strength) as the factory installed spring, in combination with an operatively associated waved spring washer (12) with a lower (weaker) spring characteristic than the shorter underdrive accumulator piston spring resulting in a continuous two stage movement of the underdrive accumulator piston by the spring and washer conjointly acting on the underdrive accumulator piston, the fluid pressure applied to the underdrive clutch is maintained at a level which does not overcome the resilient force of the underdrive piston return spring (14) and results in a smoother apply to the underdrive clutch (8) thereby preventing damage thereto.

Figure 3:
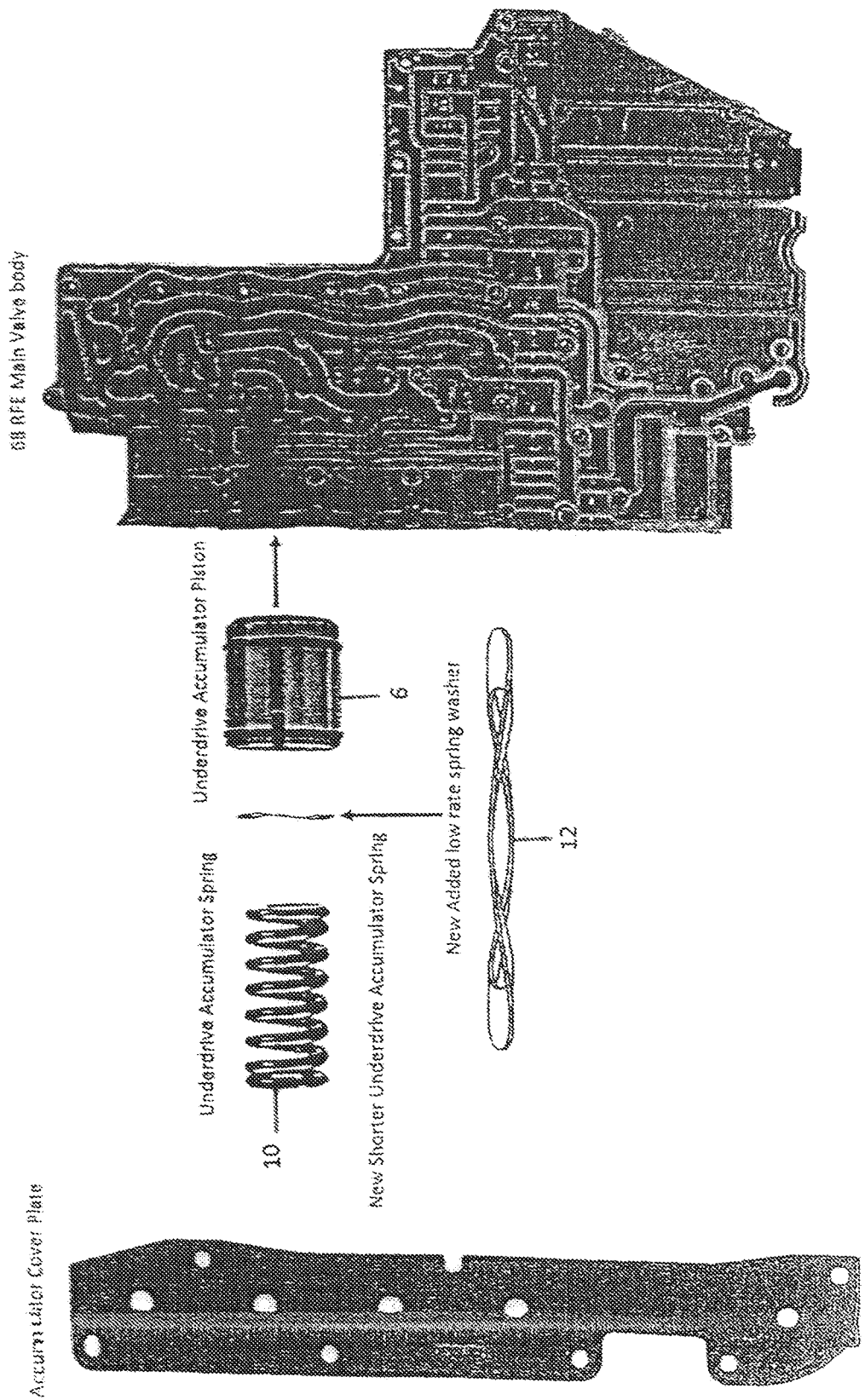
FIG. 3 schematically illustrates the structural components of the modifications to the underdrive hydraulic circuit in accordance with the present invention.

FIG. 3 schematically illustrates the structural and operative relationship between the shortened underdrive accumulator piston replacement spring (10), the new waved spring washer (12), and the underdrive accumulator piston (6) in accordance with the present invention.

The new waved spring washer (12) is disposed between the new shortened underdrive accumulator spring (10) and the rear end surface of the underdrive accumulator piston (6). As fluid pressure is applied to the left end of the shortened underdrive accumulator spring as shown in FIG. 3, the applied pressure first causes the spring washer to compress from its fully expanded relaxed position to its fully compressed/flattened position, driving the underdrive accumulator piston to move a first predetermined distance controlled by the spring washer during a first stage of movement of the underdrive accumulator piston. When the spring washer is flattened, the underdrive accumulator piston is then continuously driven a second predetermined distance controlled by shortened underdrive accumulator piston spring during a second (final) stage of movement of the underdrive accumulator piston.

Accordingly, the continuous two stage movement of the underdrive accumulator piston, and the fluid pressure required to complete the two stage movement of the underdrive accumulator piston, is controlled and determined by the spring characteristics (strength) and length of both the waved spring washer and the shortened underdrive accumulator piston spring, respectively, as the washer and spring operatively cooperate with each other to conjointly move the underdrive accumulator piston a total of the first and second predetermined distances.

As a result of the replacement of a portion of the higher rated (stronger) underdrive accumulator spring with a lower rated (weaker) spring washer, less fluid pressure is required to move the underdrive accumulator piston its fully traveled distance, thereby maintaining the fluid pressure applied to the underdrive apply piston and thus the underdrive clutch below the fluid pressure which will overcome the resilient force of the accumulator piston return springs so as to result in a smooth apply to the underdrive clutch, thereby avoiding damage thereto when the transmission is in 5th or 6th gear and the underdrive clutch is turned off.

The discussion of the best mode for carrying out the invention made herein is intended to be illustrative and not restrictive of the scope of the invention.

Thus, although the spring is longer and stronger than the spring washer in accordance with the preferred embodiment of the invention as discussed herein, these parameters can be modified. Additionally, although the first predetermined distance travelled by the underdrive accumulator piston when movement of the piston is controlled by the washer is shorter than the second predetermined distance travelled by the underdrive accumulator piston when movement of the piston is controlled by the spring in accordance with the preferred embodiment of the invention as discussed herein, this relationship can also be modified.

Accordingly, the scope of the invention is not limited to the preferred embodiments disclosed herein, but is defined only by the following claims and all equivalents thereto.

The invention claimed is:

1. In an hydraulic circuit for an automatic automotive transmission including an underdrive circuit comprising an underdrive apply piston, an underdrive piston return spring acting on said underdrive apply piston, an underdrive clutch operatively associated with said underdrive apply piston, and an underdrive accumulator piston driven by an underdrive accumulator piston spring having a predetermined length for controlling fluid pressure applied to said underdrive apply piston, the improvement comprising a modified hydraulic circuit formed by:
replacing said underdrive accumulator piston spring with a shorter underdrive accumulator piston spring and a spring washer operatively associated with said shorter underdrive accumulator piston spring for conjointly driving said underdrive accumulator piston in two consecutive continuous stages of movement, a first said stage controlled by compression of said spring washer until said spring washer is fully compressed, and a second said stage controlled by compression of said shorter underdrive accumulator piston spring after said spring washer is fully compressed, such that fluid pressure applied to said underdrive apply piston does not exceed the resilient force of said underdrive piston return spring acting on said underdrive apply piston.

2. The hydraulic circuit as claimed in claim 1, wherein the spring rating of said shorter underdrive accumulator piston spring is greater than the spring rating of said spring washer.

3. The hydraulic circuit as claimed in claim 2, wherein said underdrive accumulator piston is moved a first predetermined distance in said first stage of movement by compressing said spring washer.

4. The hydraulic circuit as claimed in claim 3, wherein said underdrive accumulator piston is moved a second predetermined distance in said second stage of movement by compressing said shorter underdrive accumulator spring after said underdrive accumulator piston has moved said first predetermined distance.

5. The hydraulic circuit as claimed in claim 4, wherein fluid pressure applied to move said underdrive accumulator piston said first predetermined distance by said spring washer is less than fluid pressure applied to move said underdrive accumulator piston said second predetermined distance by said shorter underdrive accumulator spring.

6. The hydraulic circuit as claimed in claim 5, wherein said first predetermined distance is shorter than said second predetermined distance.

7. The hydraulic circuit as claimed in claim 1, wherein said automatic automotive transmission is Model 68RFE of CHRYSLER Corporation.

8. A method of modifying an automatic automotive transmission including an underdrive circuit comprising an underdrive apply piston, an underdrive piston return spring acting on said underdrive apply piston, an underdrive clutch operatively associated with said underdrive apply piston, and an underdrive accumulator piston driven by an underdrive accumulator piston spring having a predetermined length for controlling fluid pressure applied to said underdrive apply piston, the steps of said method comprising:
replacing said underdrive accumulator piston spring with a shorter underdrive accumulator piston spring and a spring washer operatively associated with said shorter underdrive accumulator piston spring for conjointly driving said underdrive accumulator piston in two consecutive continuous stages of movement, a first said stage controlled by compression of said spring washer until said spring washer is fully compressed, and a second said stage controlled by compression of said shorter underdrive accumulator piston spring after said spring washer is fully compressed, such that fluid pressure applied to said underdrive apply piston does not exceed the resilient force of said underdrive piston return spring acting on said underdrive apply piston.

9. The method as claimed in claim 8, including the step of selecting said spring rating of said shorter underdrive accumulator piston spring to be greater than the spring rating of said spring washer.

10. The method as claimed in claim 9, including the step of moving said underdrive accumulator piston a first predetermined distance in said first stage of movement by compressing said spring washer.

11. The method as claimed in claim 10, including the step of moving said underdrive accumulator piston said second predetermined distance in said second stage of movement by compressing said shorter underdrive accumulator spring after said underdrive accumulator piston has moved said first predetermined distance.

12. The method as claimed in claim 11, including the step of applying fluid pressure to move said underdrive accumulator piston said first predetermined distance by said spring washer which is less than fluid pressure applied to move said underdrive accumulator piston said second predetermined distance by said shorter underdrive accumulator spring.

13. The method as claimed in claim 12, wherein said first predetermined distance is shorter than said second predetermined distance.

14. The method as claimed in claim 8, wherein said automatic automotive transmission is Model 68RFE of CHRYSLER Corporation.

15. An hydraulic circuit for an automatic automotive transmission including an underdrive circuit comprising an underdrive apply piston, an underdrive piston return spring acting on said underdrive apply piston, an underdrive clutch operatively associated with said underdrive apply piston, and an underdrive accumulator piston conjointly driven by an underdrive accumulator piston spring and a spring washer operatively associated with said underdrive accumulator piston spring in two consecutive continuous stages of movement, a first said stage controlled by compression of said spring washer until said spring washer is fully compressed, and a second said stage controlled by compression of said shorter underdrive accumulator piston spring after said spring washer is fully compressed, such that fluid pressure applied to said underdrive apply piston does not exceed the resilient force of said underdrive piston return spring acting on said underdrive apply piston.

16. The hydraulic circuit as claimed in claim 15, wherein said spring washer drives said underdrive accumulator piston a first predetermined distance.

17. The hydraulic circuit as claimed in claim 16, wherein said underdrive accumulator piston spring drives said underdrive accumulator piston a second predetermined distance after said underdrive accumulator piston has been driven said first predetermined distance.

18. The hydraulic circuit as claimed in claim 17, wherein said first predetermined distance is shorter than said second predetermined distance.

\* \* \* \* \*